United States Patent Office 2,919,587
Patented Jan. 5, 1960

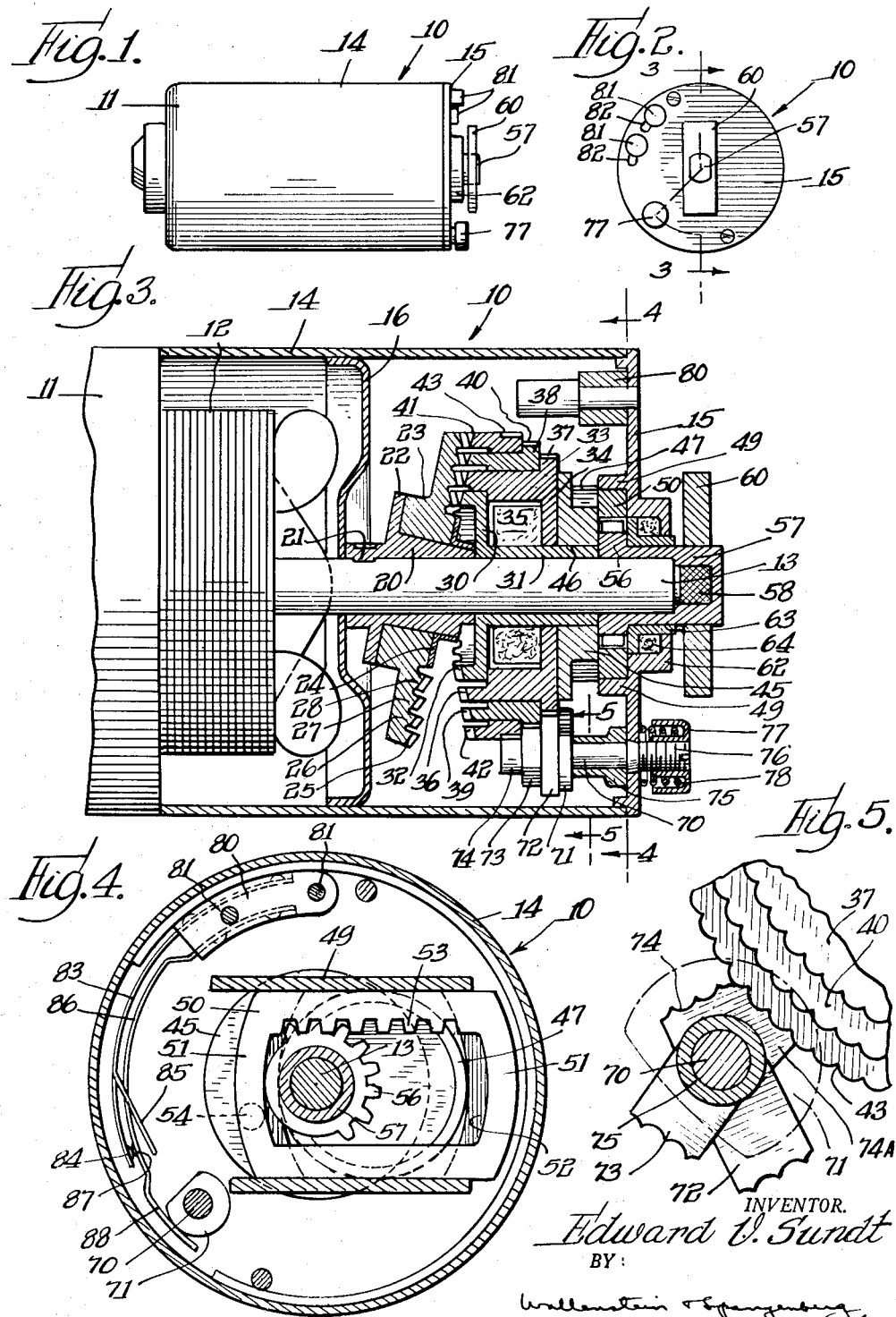

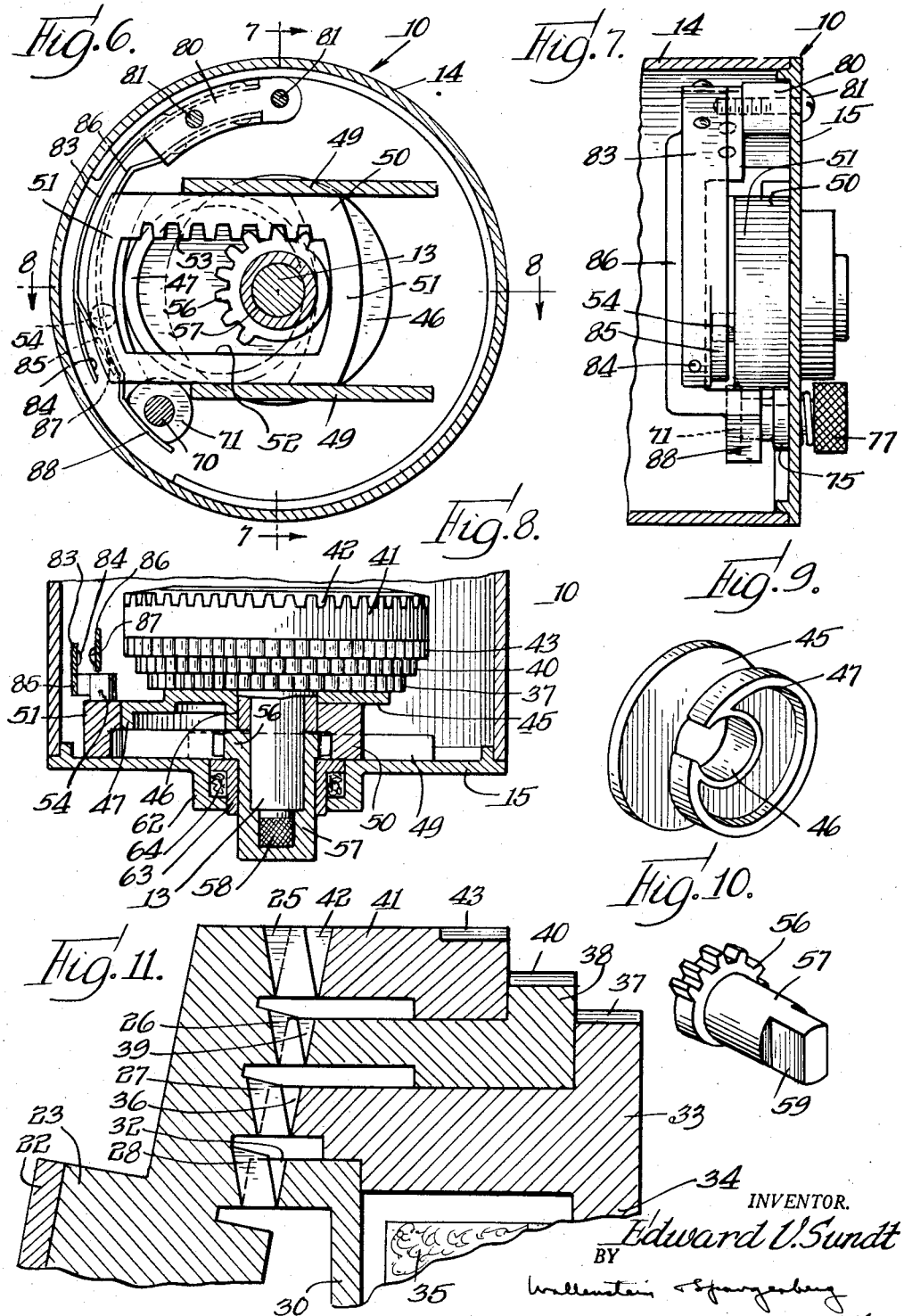

2,919,587

MULTIPLE SPEED DRIVING MECHANISM FOR WINDSHIELD WIPERS AND THE LIKE

Edward V. Sundt, Wilmette, Ill.

Application November 16, 1955, Serial No. 547,130

9 Claims. (Cl. 74—76)

The principal object of this invention is to provide a multiple speed driving mechanism for electrically operated windshield wipers and the like, wherein two or more speeds of operation are provided, wherein the overall unit is compact, small and light in weight, wherein operation for the normal life of the automotive vehicle is provided without need for lubricating the same, wherein operation and speed selection are obtained from a single selector mechanism, wherein the operating parts are enclosed to be free from dust and dirt, wherein operation is always stopped with the wiper in an end position of its stroke, and which is simple and rugged in construction, foolproof in operation, and inexpensive to manufacture.

Briefly, the multiple speed driving mechanism of the invention for driving automotive windshield wipers and the like includes a rotating shaft driven by an electric motor or the like, an oblique eccentric secured to the shaft for rotation therewith, and a wobbler member rotatably mounted on the oblique eccentric and wobbled thereby and having a plurality of rings of gear teeth concentrically arranged on one side thereof. A plurality of relatively rotatable toothed gear members are concentrically arranged about the shaft and they mesh respectively with the rings of gear teeth on the wobbler member. These toothed gear members are preferably arranged adjacent the wobbler member in nested relation and supported by the rotating shaft to form a compact unit.

A motion transmitting means is connected to one of the gear members and includes means for translating rotary motion to oscillatory motion, this motion transmitting means driving a driving means for the windshield wipers and the like. It preferably includes an eccentric driven by said one gear member, a slider reciprocated by the eccentric and having a rack thereon, and a pinion meshing with the rack and oscillated thereby. The pinion may be rotatably mounted on the shaft and a bearing support may be provided for the pinion for directly journalling the same and for indirectly journalling the outboard end of the shaft received within the pinion. The driving means is operated by the oscillating pinion.

Means are provided for selectively securing the other gear members against rotation to selectively cause the same to react against the wobbler member to control the same and hence control the speed of rotation of said one gear member and the speed of oscillation of said pinion and driving means. To obtain two different output speeds, three gear members and three rings of teeth on the wobbler member are utilized, and to obtain three different output speeds, four gear members and four rings of teeth on the wobbler member are utilized. For additional output speeds, additional gear members and rings of gear teeth may be used, and if only a single speed is desired only two gear members and two rings of teeth on the wobbler member are required. By appropriately selecting the numbers of teeth on the rings of gear teeth on the wobbler member and the teeth on the gear members desired output speeds and speed ratios may be obtained.

Electrical means are provided for starting and stopping the electric motor and hence the windshield wipers operated thereby and they include normally closed switch means for maintaining the electric motor in operation. Means are provided on the motion transmitting means, the slider reciprocated by the eccentric, for engaging the switch means to open the same when the wipers are moved to an end position for continuing motor operation until the driving means is oscillated to an end position and then stopping the motor. Thus, the windshield wiper unit is always stopped in an end or vision-clear position. The means for selectively securing the various gear members for speed control is also preferably utilized for controlling the electrical means for starting and stopping the motor.

Further objects of this invention reside in the details of construction of the multiple speed driving mechanism and in the co-operative relationships between the component parts thereof.

Other objects and advantages of this invention will become apparent to those skilled in the art upon reference to the accompanying specification, claims and drawings in which:

Fig. 1 is a side elevational view of a windshield wiper driving unit having the multpile speed driving mechanism of this invention incorporated therein.

Fig. 2 is an end elevational view looking from the right of Fig. 1.

Fig. 3 is a vertical sectional view through the multiple speed driving mechanism of this invention and through a portion of the operating electric motor.

Fig. 4 is a vertical sectional view taken substantially along the line 4—4 of Fig. 3.

Fig. 5 is an enlarged view partly in section taken substantially along the line 5—5 of Fig. 3.

Fig. 6 is a vertical sectional view similar to Fig. 4, but showing the parts in a different position.

Fig. 7 is a vertical sectional view taken substantially along the line 7—7 of Fig. 6.

Fig. 8 is a horizontal sectional view taken substantially along the line 8—8 of Fig. 6.

Fig. 9 is a perspective view of the eccentric incorporated in the motion transmitting means.

Fig. 10 is a perspective view of a pinion forming a part of the motion transmitting means.

Fig. 11 is an enlarged sectional view showing the mating relationships between the gear teeth on the gear members and the rings of gear teeth on the wobbler member.

Referring to the drawings and more particularly to Figs. 1 to 8, the automotive windshield wiper unit of this invention is generally designated at 10 and it includes an electric motor having a housing 11 and a motor structure 12 for rotating a shaft 13. The electric motor is of conventional construction and is driven by the electrical system of the automotive vehicle and will operate to rotate the shaft 13 at substantially 3000 r.p.m. The multiple speed driving mechanism, which is operated by the electric motor, is arranged concentrically about the extending shaft 13 and it is preferably enclosed by a cover 14 and end plate 15, which are suitably secured to the motor housing 11 in any desired manner, as by elongated bolts or the like. Preferably the multiple speed driving mechanism is separated from the motor 12 by a grease guard 16 suitably secured in place within the cover 14, the shaft 13 extending through the guard 16.

The multiple speed driving mechanism, which also operates as a speed reducer, includes an oblique eccentric 20 which is preferably molded of porous iron and which is secured to and carried by the shaft 13 in any suitable manner as by swedging or staking the same thereon as indicated at 21. As shown for purposes of illustration herein, the axis of the oblique eccentric 20 is arranged at an angle of substantially 10° with respect to the axis of the shaft 13, this angle producing extremely satisfactory results for the particular purposes herein illustrated. The oblique eccentric 20 is provided with a guide flange 22. Rotatably mounted on the oblique eccentric 20, adjacent its flange 22, is a wobbler member 23, which is preferably formed of molded nylon or the like. The wobbler member 23 is held on the oblique eccentric 20 adjacent the flange 22 by a retaining ring 24 which is pressed-fit onto the oblique eccentric 20. The wobbler member 23 rotates with respect to the oblique eccentric 20 and is also wobbled thereby. Preferably the oblique eccentric 20 is saturated with a lubricant for lubricating the rotating surfaces between it and the wobbler member 23. The wobbler member 23 is provided on one face with a plurality of concentrically arranged rings of gear teeth, four such rings being illustrated at 25, 26, 27 and 28, respectively, to provide three different output speeds. If only two output speeds are desired, then only three rings of gear teeth are necessary and if larger number of output speeds are desired, the number of rings of gear teeth may be correspondingly increased. If only a single speed of operation is desired, then only two rings of gear teeth are necessary. Preferably these rings of gear teeth are molded in the wobbler member 23, although they may be cut therein, if so desired.

Rotatably mounted on the extended motor shaft 13, is a gear member 30, having a sleeve hub 31 extending outwardly along the shaft 13. This gear member 30 and its hub 31 are preferably formed of molded porous iron which is also impregnated with a lubricant for lubricating the rotating surfaces between the sleeve hub 31 and the motor shaft 13. The gear member 30 is provided with longitudinally facing gear teeth 32 which mesh with the ring 28 of gear teeth on the wobbler member 23. Rotatably mounted on and nesting with the gear member 30 is another gear member 33 which has a flange 34 rotatably bearing against the sleeve hub 31. The gear member 33 with its flange 34 cooperate with the gear member 30 and its sleeve hub 31 to define an enclosed annular chamber 35 which is filled with a woolen wick which, in turn, is impregnated with a lubricant for continuously supplying lubrication to the porous iron gear member 30 and sleeve hub 31. Gear member 33 is also provided with longitudinally extending gear teeth 36 which mesh with the ring 27 of gear teeth on the wobbler member 23. The gear member 33 is also provided with radially extending rounded teeth 37.

Rotatably mounted on and nesting with the gear member 33 is another gear member 38, this gear member 38 being provided with longitudinally extending teeth 39 which mesh with the ring 26 of gear teeth on the wobbler member 23. This gear member 38 is also provided with radially extending rounded teeth 40. Rotatably mounted on and nesting with the gear member 38 is a further gear member 41 having longitudinally extending teeth 42 meshing with the ring 25 of gear teeth on the wobbler member 23 and also having radially extending rounded teeth 48. The gear members 30, 33, 38 and 41 are, accordingly, nested in concentric relation about the motor shaft 13, they are all rotatable with respect to each other, and the teeth thereof continuously mesh with the corresponding rings of gear teeth on the wobbler member 23. Preferably the gear members 33, 38 and 41 are formed of molded nylon or the like.

The various gear members are held in rotatable nested relation about the shaft 13 and sleeve hub 31 by an eccentric member 45 which is provided with a central hole 46 therethrough for receiving the sleeve hub 31 of the gear member 30. The eccentric member is secured to the sleeve hub 31 in any suitable manner as, for example, by a pressed-fit. Thus, the eccentric member 45 rotates with the gear member 30 as it is rotated. The eccentric member 45 includes an eccentric 47 which forms part of the mechanism for translating rotary motion of the gear member 30 into oscillating motion.

The end wall 15, which may be in the form of a die casting, is provided with a pair of parallel and inwardly extending guides 49. Slidably mounted in these guides 49 is a sliding rack member 50. This rack member 50 is provided at its ends with inwardly extending ears 51 which engage diametrically opposite portions of the eccentric 47 so that as the eccentric 47 is rotated the rack member 50 is reciprocated back and forth along the guides 49. The rack member 50 is provided with a central opening 52 therethrough and the upper edge of this opening 52 is provided with rack teeth 53. One of the ears 51 of the rack member 50 is also provided with an inwardly extending abutment or pin 54, the utility of which will be pointed out hereafter.

A pinion 56 having a sleeve hub 57 is rotatably mounted on the end of the extending shaft 13, and throughout a portion of its periphery it is provided with teeth meshing with the rack teeth 53 of the rack member 50. As the rack member 50 is reciprocated by the eccentric 47, the pinion 56 is oscillated about the shaft 13 by the rack teeth 53. The arrangement is preferably such that the pinion will be oscillated back and forth through substantially 120°. The pinion gear 56 and its sleeve hub 57 are preferably formed of molded iron which is impregnated with a suitable lubricant for lubricating the rotating surfaces between it and the shaft 13. Further, the sleeve hub 57 is extended outwardly beyond the end of the shaft 13 and it is constructed to provide an enclosed chamber 58 for containing a lubricant-soaked wick for supplying additional lubrication to the sleeve hub 57. The eccentric member 45 is also formed of molded porous iron which is impregnated with a lubricant so as to provide for lubricating the surfaces thereof. The rack member 50 which is reciprocated by the eccentric 47 and which oscillates the pinion 56, is preferably molded from nylon, nylatron or the like. Thus, efficient operation of the motion transmitting means without need for additional lubrication is provided.

The outer end of the sleeve hub 57 of the pinion 56, is provided with flattened portions 59 for receiving an arm 60 which forms the driving means for the windshield wipers. Thus, as the motor is operated, the arm 60 is oscillated through substantially 120° and at a desired speed as will be pointed out more fully hereafter. The end plate 15 is also provided with a hollow boss 62 in which is secured, as by a pressed-fit, a powdered bronze bushing 63 which, in turn, is impregnated with a suitable lubricant. The box 62 and bushing 63 also provide for an annular chamber 64 in which is located a lubricant impregnated wick which supplies additional lubrication to the bushing 63. The bushing 63 operates to rotatably journal the sleeve hub 57 of the pinion 56 and since the end of the rotating shaft 13 is journalled within the sleeve hub 57, the bushing 63 also operates indirectly as an outboard journal support for the end of the shaft 13.

To provide for different speeds of operation of the unit, the gear members 33, 38 and 41 are selectively secured against rotation so as to react against the wobbler member 23. This selective securing is accomplished by a selector mechanism which includes a shaft 70 which is provided with a cam 71 and four radially disposed arms 72, 73, 74 and 74A. These arms are provided with pointed teeth which are adapted to mesh with the rounded teeth 37, 40 and 43, respectively, on the respective gear members 33, 38 and 41. When the teeth on the arm 72 mesh with the rounded teeth 37, the gear member 33 is secured against rotation. Likewise when the teeth on the arm 73 mesh with the rounded teeth 40 on the gear member 38, the gear member 38 is secured against rotation, and when the teeth on the arms 74 and 74A mesh with the rounded teeth 43 on the gear member 41, the gear member 41 is secured against rotation. Thus, dependent upon the rotative position of the shaft 70, one or the other of the gear members 33, 38 and 41 are secured against rotation.

A sleeve 75 is arranged about the shaft 70 and is interposed between the cam 71 and the flat surface of the end plate 15 and this sleeve operates to resiliently hold the shaft 70 normal to the flat surface of the end plate 15 with the teeth on the arms 72, 73, 74 or 74A in mesh with the rounded teeth 37, 40 or 43, respectively. The shaft 70 is provided with a screw-threaded extension 76 which extends through a tapered hole in the end plate 15. A knob 77 is screw-threaded onto the extension 76 and it may be secured in place thereon by swedging a portion of the knob into a slot in the end of the extension 76. In this way the knob 77 is secured against rotation on the shaft extension 76. Interposed between the knob 77 and the outer surface of the end plate 15, is a spring 78 which operates to resiliently hold the sleeve 75 against the inner flat surface of the end plate 15 in turn to resiliently hold the shaft 70 in a normal position with the teeth of the arms engaging the selected rounded teeth on the gear members. When the shaft 70 is rotated by the knob 77, to shift from one position, for example, where the teeth on the arm 74 engage the rounded teeth 43 to a position where the teeth on the arm 73 engage the rounded teeth 40, the shaft 70 is allowed to tilt in the tapered hole in the end plate to permit this selective turning. It is noted that the curvatures of the teeth on the arms 72, 73, 74 and 74A correspond generally to the curvatures of the teeth 43, 40 and 37, respectively, so that the arms, when moved into engagement with the respective gear members are maintained in that position for securing the respective gear members against rotation. If, however, the load on the driving means 60 should become excessive so as to produce a large reactive turning force on the gear member which is held against rotation, this excessive reactive turning force will cause the shaft 70 to pivot in the tapered hole in the cover plate 15 and rotate to a position to release the gear member which had been secured thereby against rotation. Thus, the selector mechanism which selectively secures the gear members 33, 38 and 41 against rotation, includes resilient releasable means to allow the same to rotate in the event that the load upon the driving means becomes excessive. This effectively prevents stalling and burning out of the electric motor upon the occurrence of excessive loads upon the driving mechanism.

For purposes of describing the operation of the multiple speed driving mechanism of this invention, it is assumed that the shaft 13 is driven at a substantially constant speed of 3000 r.p.m. when the electric motor is operating, and also that the numbers of teeth in the rings of gear teeth on the wobbler member 26 and on the gear members 30, 33, 38 and 41 areas follows: The ring 25 of gear teeth on the wobbler member contains 46 teeth and the number of meshing teeth on the gear member 41 is 45. The ring 26 of gear teeth contains 67 teeth and the gear member 38 has 66 teeth meshing therewith. The ring 27 of gear teeth contains 35 teeth and the teeth on the gear member 33 are 36 in number. The ring 28 of gear teeth consists of 36 teeth and the gear member 30 has 35 teeth meshing therewith.

Assuming that the arm 74 on the selector mechanism is rotated to the position to secure the gear member 41 against rotation, that gear member becomes the reaction gear for the wobbler member 23 and since the gear member 41, having 45 teeth, has one less tooth than the ring 25 of gear teeth, which has 46 teeth, there is a tooth difference of one tooth which causes the wobbler member 33 to turn on its axis at the rate of $$\frac{3000}{46} = 65 \text{ r.p.m.}$$

in the shaftwise direction, i.e. in the same direction as the shaft 13 is rotated. This rotation of the wobbler member 23 is imparted to the gear member 30 through the meshing gear teeth 28 and 32. Since the ring 28 of gear teeth has 36 teeth and since there are 35 teeth on the gear member 30, this relation of gear teeth causes the gear member 30 to rotate in a counter-shaftwise direction, i.e. in a direction opposite to the direction of rotation of the shaft 13, with respect to the wobbler member 23 at the rate of $$\frac{3000}{35} = 86 \text{ r.p.m.}$$

Since the rotation caused by the intermeshing of the gear member 30 and the wobbler member 23 in greater than the rotation caused by the intermeshing of the gear member 41 and the wobbler member 23, the resultant speed at which the gear member 30 is driven under these conditions is 86 r.p.m.—65 r.p.m.=21 r.p.m. in the counter-shaftwise direction. Thus, when the selector mechanism is manipulated to cause the arm 74 to secure the gear member 41 against rotation, the gear member 30 is driven at a speed of 21 r.p.m. in a counter-shaftwise direction to cause the driving means 60 to oscillate at a corresponding speed, namely, 21 oscillations per minute.

If now the selector mechanism is manipulated to cause the toothed arm 73 thereof to engage and secure the gear member 38 against rotation, the gear member 30 and the driving means oscillated thereby are driven at a different speed. In this connection, the ring 26 of gear teeth includes 67 teeth and the meshing gear member 38 has 66 teeth. Thus, the wobbler member 23 is driven in a shaftwise direction at a rate of $$\frac{3000}{67} = 45 \text{ r.p.m.}$$

When this rotation is subtracted from the roation of 86 r.p.m. brought about by the intermeshing of the gear member 30 and the wobbler member 23, the resultant speed of rotation of the gear member 30 is 86 r.p.m.—45 r.p.m.=41 r.p.m. in the counter-shaftwise direction. Thus, when the selector mechanism is manipulated to secure the gear member 38 against rotation, the driving means 60 is oscillated in the same manner as before, but at 41 oscillations per minute rather than 21 oscillations per minute.

When the selector mechanism is manipulated to cause the toothed arm 72 to engage and secure the gear member 33 against rotation so as to react against the wobbler member 23, no rotation is imparted to the wobbler member 23 since the number of teeth in the ring 27 of the wobbler member 23 is the same as the number of gear teeth 36 on the gear member 33, namely, 36 teeth. Thus, the only rotation imparted to the gear member 30 is caused by the meshing of the teeth on the gear member 30 with the ring 28 of gear teeth on the wobbler member 23. Accordingly, when the selector mechanism is manipulated to secure the gear member 33 against rotation, the gear member 30 is rotated at 86 r.p.m. in the counter-shaftwise direction and the driving means 60 is oscillated in the same manner as before, but at 86 oscillations per minute.

Accordingly, with the particular embodiment here described, it is possible by manipulating the selector mechanism to selectively obtain speeds of oscillation of the driving means of 21 oscillations per minute, 41 oscillations per minute and 86 oscillations per minute with the rotating shaft 13 rotating in the same direction at substantially 3000 r.p.m. By selecting different numbers of gear teeth on the various teeth, various speeds of rotation of the gear member 30, and hence various speeds of oscillation of the driving means 60, may be selectively obtained. To bring about quiet operation with least amount of gear friction, it is desirable to so construct the gear teeth that as they are coming into engagement with each other there is substantially a point contact as distinguished from a line contact. Toward this end the top edges of the gears are arranged at an angle with respect to the radial axis of the gear members and the wobbler member. For the optimum results in the particular embodiment here described, and as shown in more detail in Fig. 5, this angle is made equal to the angle of the oblique eccentric, namely, 10°. It is found that quite satisfactory results are obtained if the top edges of the teeth on the gear members and the mating top edges of the teeth of the rings of teeth on the wobbler member have a total angle therebetween at least as great as the angle between the axis of the oblique eccentric and the axis of the shaft.

The operation of the electric motor, that is, the starting and stopping of it, is controlled by a switch means included in the electric connections to the electric motor, which switch means is controlled primarily by the cam 71 on the speed selector mechanism. Provision is here made that when the selector mechanism is operated to stop operation of the electric motor, the electric motor is continued in operation until the driving mechanism is operated to an end position, for example, a position wherein the windshield wipers are moved to an end or clear position. In this connection the switch means includes a block 80, formed of electrical insulating material such as Bakelite or the like, which is circumferentially adjustably secured to the inside of the end plate 15 by means of screws 51 extending through circumferential slots 82 in the end plate 15. Secured to the block 80 is one end of a resilient spring arm 83, the other end of which carries a contact 84. This spring arm 83 is also provided with an inwardly projecting finger 85. The block 80 also carries another resilient spring arm 86 which carries a contact 87 adapted to engage the contact 84 and this spring arm 86 is provided with an extension 88 adapted to engage the cam 71 of the speed selector mechanism. The spring arms 83 and 86 are formed from resilient electrical conducting material such as Phosphor bronze or the like and they are so formed as to cause the contacts 84 and 87 to normally engage each other to form a normally closed switch means. The spring arms 83 and 86 and the contacts 84 and 87 are connected in series in the electrical circuit leading to the electric motor so that when the contacts 84 and 87 are engaging each other, the motor operates and when they are separated the motor stops.

When the speed selector mechanism is positioned so as to have any one of the arms 72, 73 and 74 engaging their respective gear members, the high dwell of the cam 71 engages the extension 88 on the spring arm 86 for maintaining the contacts 84 and 87 in engagement and for maintaining the finger 85 of the spring arm 83 out of the path of reciprocating movement of the pin 54 on the rack member 50. Thus, in these three positions of the selector mechanism the electric motor operates continuously. When, however, the speed selector mechanism is moved to the position illustrated in Figs. 5 and 6, the low dwell on the cam 70 is engaged by the extension 88 on the spring arm 86. As a result, the spring arm 86 moves inwardly and this inward movement is followed by the spring arm 83 so that the contacts 84 and 87 remain in engagement to continue operation of the electric motor. It is here noted that when the speed selector mechanism is moved to this position, the position for initiating stopping of the electric motor, the arm 74A engages the rounded teeth 43 of the gear member 41 to secure the same against rotation in the same manner as the arm 74 and as a result the driving mechanism is positively operated while the electric motor is running. The electric motor continues to operate until such time as the track member 50 moves to an end position as illustrated in Figs. 6 and 8 and when this occurs the pin 54 on the rack member 50 engages the finger 85 on the spring member 83 to move the contact 84 out of engagement with the contact 87. This interrupts the energization of the electric motor and stops the same so that the unit stops in the end position where the windshield wipers are in an end or clear position. When it is desired to restart the unit the selector mechanism is moved to the desired speed position and the cam 71 is correspondingly moved to cause the contact 87 to engage the contact 84 to restart operation of the electric motor. The block 80 may be circumferentially adjusted for determining the point at which the pin 54 engages the finger 85 and, therefore, for determining the end position at which the operation of the unit is stopped. Accordingly, the speed selector mechanism, in addition to controlling the speed at which the unit operates, also controls the starting and stopping of the unit and when the selector mechanism is moved to a position to stop operation of the unit, the unit continues to operate until it reaches an end position at which time it automatically stops.

While for purposes of illustration, one form of this invention has been disclosed, other forms thereof may become apparent to those skilled in the art upon reference to this disclosure and, therefore, this invention is to be limited only by the scope of the appended claims.

I claim as my invention:

1. A multiple speed driving mechanism for windshield wipers and the like comprising, an electric motor, a shaft rotated by the motor, an oblique eccentric secured to the shaft for rotation therewith, a wobbler member rotatably mounted on the oblique eccentric and wobbled thereby and having at least three rings of gear teeth concentrically arranged thereon, at least three relatively rotatable toothed gear members concentric with the shaft and meshing respectively with the rings of gear teeth on the wobbler member, an eccentric driven by one of the gear members concentrically with the shaft, a slider reciprocated by the eccentric and having a rack thereon, a pinion concentric with the shaft and meshing with the rack and oscillated thereby, driving means concentric with the shaft and oscillated by the pinion through a fixed angle of oscillation for driving the windshield wipers and the like, and means for selectively securing the other gear members against rotation to selectively cause the same to react against the wobbler member to control the same and hence control the speed of rotation of said one gear member and the speed of oscillation of said pinion and driving means.

2. A multiple speed driving mechanism for windshield wipers and the like comprising, an electric motor, a shaft rotated by the motor, an oblique eccentric secured to the shaft for rotation therewith, a wobbler member rotatably mounted on the oblique eccentric and wobbled thereby and having at least three rings of gear teeth concentrically arranged thereon, at least three relatively rotatable toothed gear members concentric with the shaft and meshing respectively with the rings of gear teeth on the wobbler member, motion transmitting means concentric with the shaft and connected to one of the gear members and including means for translating rotary motion of said gear member to oscillating motion, driving means concentric with the shaft and oscillated by the motion transmitting means through a fixed angle of oscillation for driving the windshield wipers and the like, and means for selectively securing the other gear members against rotation to selectively cause the same to react against the wobbler member to control the same and hence control the speed of rotation of said one gear member and the speed of oscillation of said driving means.

3. A multiple speed driving mechanism for windshield wipers and the like comprising, an electric motor, a shaft rotated by the motor, an oblique eccentric secured to the shaft for rotation therewith, a wobbler member rotatably mounted on the oblique eccentric and wobbled thereby and having at least three rings of gear teeth concentrically arranged on one side face thereof, at least three relatively rotatable toothed gear members concentrically arranged in nested relation about the shaft adjacent said side face of the wobbler member and supported by the shaft and meshing respectively with the rings of gear teeth on the wobbler member, an eccentric driven by one of the gear members concentrically with the shaft, a slider reciprocated by the eccentric and having a rack thereon, a pinion concentric with the shaft and meshing with the rack and oscillated thereby, driving means concentric with the shaft and oscillated by the pinion through a fixed angle of oscillation for driving the windshield wipers and the like, and means for selectively securing the other gear members against rotation to selectively cause the same to react against the wobbler member to control the same and hence control the speed of rotation of said one gear member and the speed of oscillation of said pinion and driving means.

4. A multiple speed driving mechanism for windshield wipers and the like comprising, an electric motor, a shaft rotated by the motor, an oblique eccentric secured to the shaft for rotation therewith, a wobbler member rotatably mounted on the oblique eccentric and wobbled thereby and having at least three rings of gear teeth concentrically arranged on one side face thereof, at least three relatively rotatable toothed gear members concentrically arranged in nested relation about the shaft adjacent said side face of the wobbler member and supported by the shaft and meshing respectively with the rings of gear teeth on the wobbler member, motion transmitting means concentric with the shaft and connected to one of the gear members and including means for translating rotary motion of said gear member to oscillating motion, driving means concentric with the shaft and oscillated by the motion transmitting means through a fixed angle of oscillation for driving the windshield wipers and the like, and means for selectively securing the other gear members against rotation to selectively cause the same to react against the wobbler member to control the same and hence control the speed of rotation of said one gear member and the speed of oscillation of said driving means.

5. A multiple speed driving mechanism for windshield wipers and the like comprising, an electric motor, a shaft rotated by the motor, an oblique eccentric secured to the shaft for rotation therewith, a wobbler member rotatably mounted on the oblique eccentric and wobbled thereby and having at least three rings of gear teeth concentrically arranged on one side face thereof, a first toothed gear member having a sleeve hub rotatably mounted on the shaft adjacent said side face of the wobbler member, a plurality of other relatively rotatable toothed gear members arranged in nested relation on said first gear member adjacent said side face of the wobbler member, said toothed gear members meshing respectively with the rings of gear teeth on the wobbler member, an eccentric driven by the sleeve hub of the first gear member concentrically with the shaft, a slider reciprocated by the eccentric and having a rack thereon, a pinion rotatably mounted on the shaft and meshing with the rack and oscillated thereby, driving means concentric with the shaft and oscillated by the pinion through a fixed angle of oscillation for driving the windshield wipers and the like, and means for selectively securing said other gear members against rotation to selectively cause the same to react against the wobbler member to control the same and hence control the speed of rotation of said first gear member and the speed of oscillation of said pinion and driving means.

6. A multiple speed driving mechanism for windshield wipers and the like comprising, an electric motor, a shaft rotated by the motor, an oblique eccentric secured to the shaft for rotation therewith, a wobbler member rotatably mounted on the oblique eccentric and wobbled thereby and having at least three rings of gear teeth concentrically arranged on one side face thereof, a first toothed gear member having a sleeve hub rotatably mounted on the shaft adjacent said side face of the wobbler member, a plurality of other relatively rotatable toothed gear members arranged in nested relation on said first gear member adjacent said side face of the wobbler member, said toothed gear members meshing respectively with the rings of gear teeth on the wobbler member, motion translating means concentric with the shaft and connected to the sleeve hub of said first gear member and including means for translating rotary motion of said first gear member to oscillatory motion, driving means concentric with the shaft and oscillated by the motion transmitting means through a fixed angle of oscillation for driving the windshield wipers and the like, and means for selectively securing said other gear members against rotation to selectively cause the came to react against the wobbler member to control the same and hence control the speed of rotation of said first gear member and the speed of oscillation of said driving means.

7. A multiple speed driving mechanism for windshield wipers and the like comprising, an electric motor, a shaft rotated by the motor, an oblique eccentric secured to the shaft for rotation therewith, a wobbler member rotatably mounted on the oblique eccentric and wobbled thereby and having at least three rings of gear teeth concentrically arranged on one side face thereof, a first toothed gear member having a sleeve hub rotatably mounted on the shaft adjacent said side face of the wobbler member, a plurality of other relatively rotatable toothed gear members arranged in nested relation on said first gear member adjacent said side face of the wobbler member, said toothed gear members meshing respectively with the rings of gear teeth on the wobbler member, an eccentric driven by the sleeve hub of the first gear member concentrically with the shaft, a slider reciprocated by the eccentric and having a rack thereon, a pinion having a sleeve hub rotatably mounted on the shaft and meshing with the rack and oscillated thereby, a bearing support for the sleeve hub of the pinion to support the same and also to provide an outboard bearing support for the shaft journalled in said sleeve hub, driving means concentric with the shaft and oscillated by the sleeve hub of the pinion through a fixed angle of oscillation for driving the windshield wipers and the like, and means for selectively securing said other gear members against rotation to selectively cause the same to react against the wobbler member to control the same and hence control the speed of rotation of said first gear member and the speed of oscillation of said pinion and driving means.

8. A multiple speed driving mechanism for windshield wipers and the like comprising, an electric motor, a shaft rotated by the motor, an oblique eccentric secured to the shaft for rotation therewith, a wobbler member rotatably mounted on the oblique eccentric and wobbled thereby and having at least three rings of gear teeth concentrically arranged thereon, at least three relatively rotatable toothed gear members concentric with the shaft and meshing respectively with the rings of gear teeth on the wobbler member, an eccentric driven by one of the gear members concentrically with the shaft, a slider reciprocated by the eccentric and having a rack thereon, a pinion concentric with the shaft and meshing with the rack and oscillated thereby, driving means concentric with the shaft and oscillated by the pinion through a fixed angle of oscillation for driving the windshield wipers and the like, and means for selectively securing the other gear members against rotation to selectively cause the same to react against the wobbler member to control the same and hence control the speed of rotation of said one gear member and the speed of oscillation of said pinion and driving means, said last mentioned means including resilient releasable means for releasing the selected gear member to allow the same to rotate when the load on the driving means becomes excessive.

9. A multiple speed driving mechanism for windshield wipers and the like comprising, an electric motor, a shaft rotated by the motor, an oblique eccentric secured to the shaft for rotation therewith, a wobbler member rotatably mounted on the oblique eccentric and wobbled thereby and having at least three rings of gear teeth concentrically arranged thereon, at least three relatively rotatable toothed gear members concentric with the shaft and meshing respectively with the rings of gear teeth on the wobbler member, motion transmitting means concentric with the shaft and connected to one of the gear members and including means for translating rotary motion of said gear member to oscillating motion, driving means concentric with the shaft and oscillated by the motion transmitting means through a fixed angle of oscillation for driving the windshield wipers and the like, and means for selectively securing the other gear members against rotation to selectively cause the same to react against the wobbler member to control the same and hence control the speed of rotation of said one gear member and the speed of oscillation of said driving means, said last mentioned means including resilient releasable means for releasing the selected gear member to allow the same to rotate when the load on the driving means becomes excessive.

References Cited in the file of this patent

UNITED STATES PATENTS

| | | |
|---|---|---|
| 178,071 | Martin | May 30, 1876 |
| 871,337 | Hawley | Nov. 19, 1907 |
| 964,847 | Brunhouse | July 19, 1910 |
| 1,004,918 | Shaw | Oct. 3, 1911 |
| 1,135,990 | Bronander | Apr. 20, 1915 |
| 2,357,152 | Whitted | Aug. 29, 1944 |
| 2,464,847 | Coffey | Mar. 22, 1949 |
| 2,494,538 | Baldo | Jan. 17, 1950 |

FOREIGN PATENTS

| | | |
|---|---|---|
| 236,952 | Germany | July 14, 1911 |
| 860,968 | France | Oct. 15, 1940 |
| 436,204 | France | Jan. 17, 1912 |